T. R. WEYANT.
AUTOMATIC WEIGHING MACHINE.
APPLICATION FILED SEPT. 25, 1906.
934,420.
Patented Sept. 14, 1909.
4 SHEETS—SHEET 1.
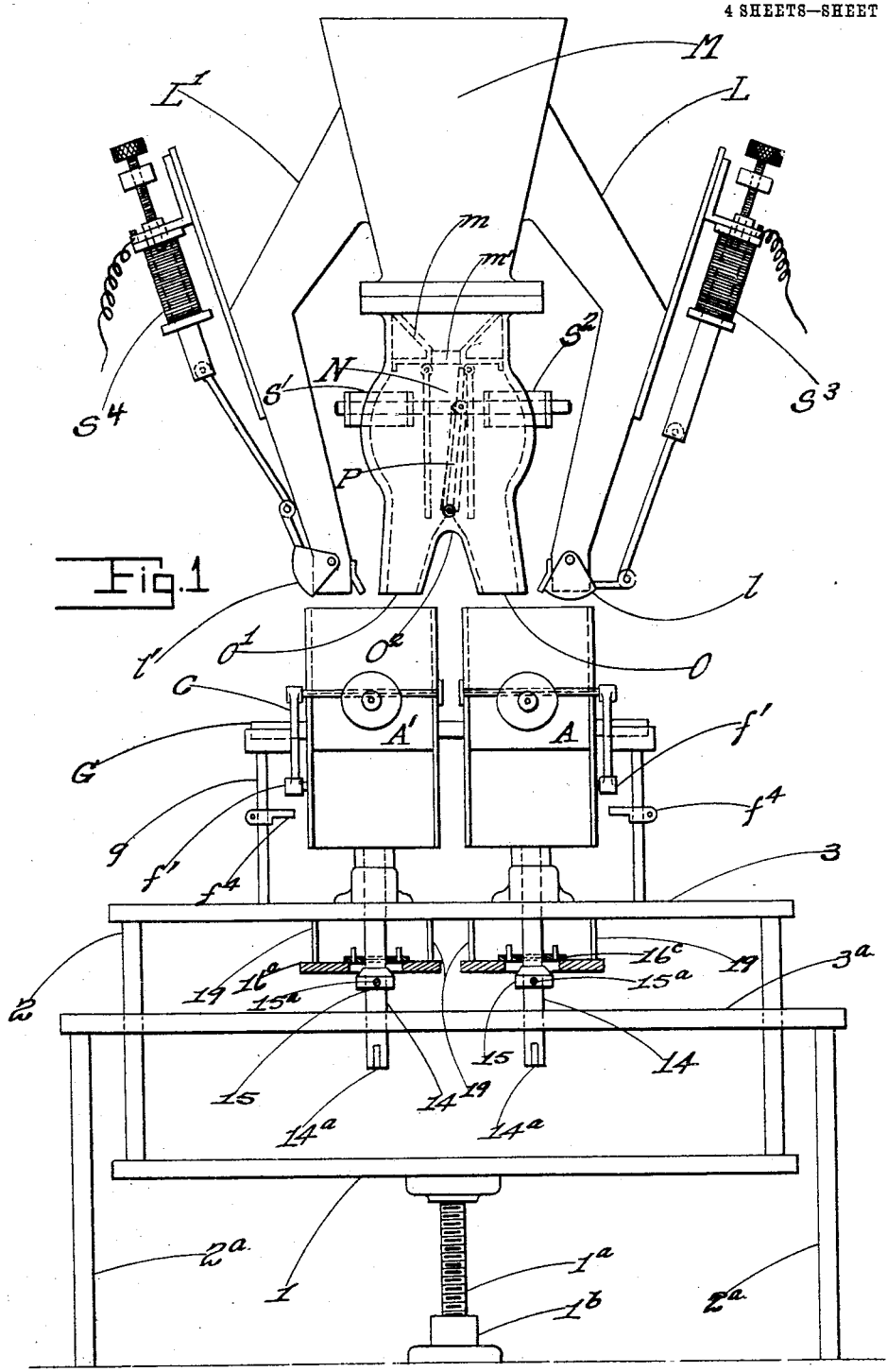
Witnesses
Inventor
Thomas Romer Weyant
By his Attorney
R. H. E. Starr.

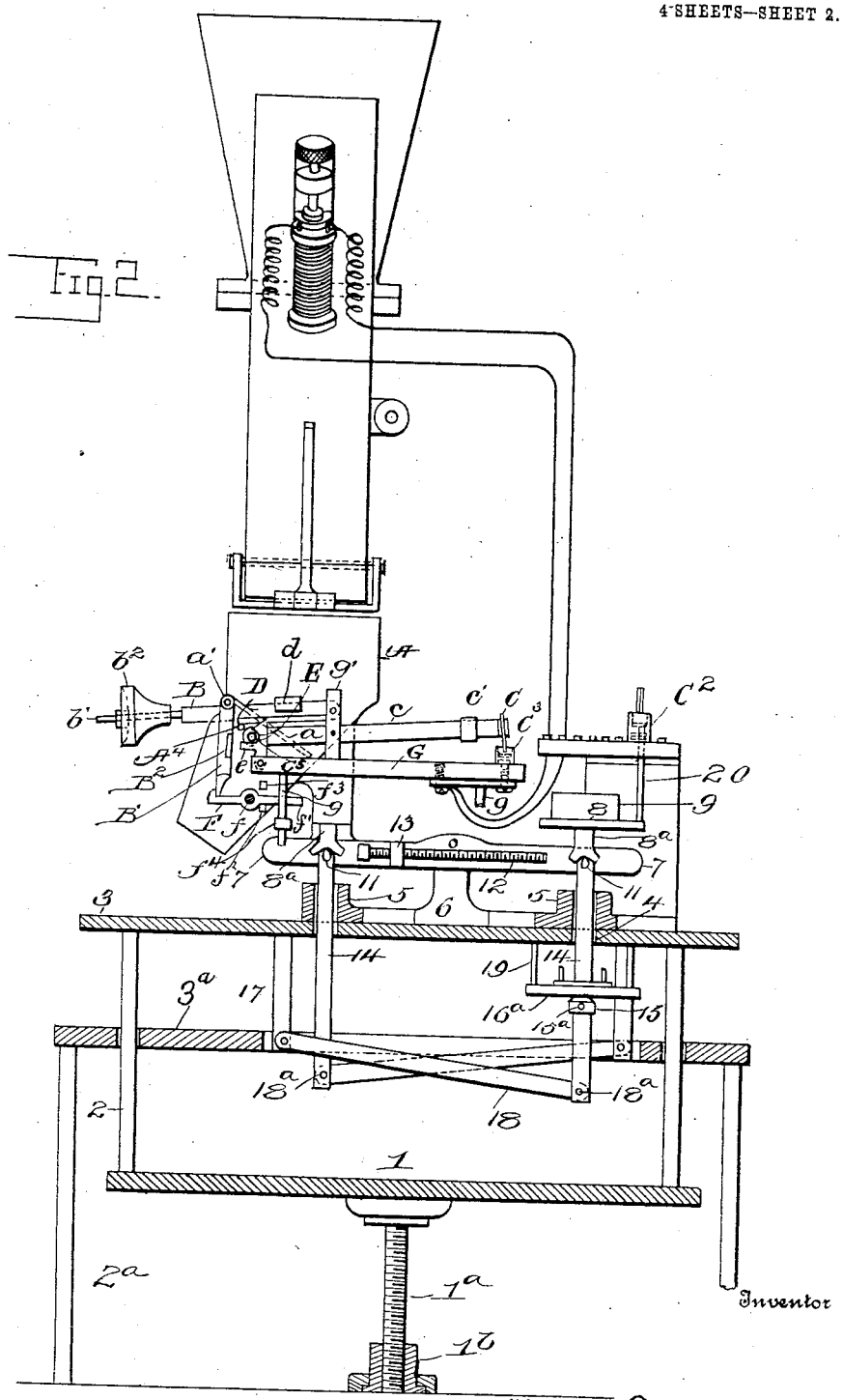

T. R. WEYANT.
AUTOMATIC WEIGHING MACHINE.
APPLICATION FILED SEPT. 25, 1906.
934,420.
Patented Sept. 14, 1909.
4 SHEETS—SHEET 3.
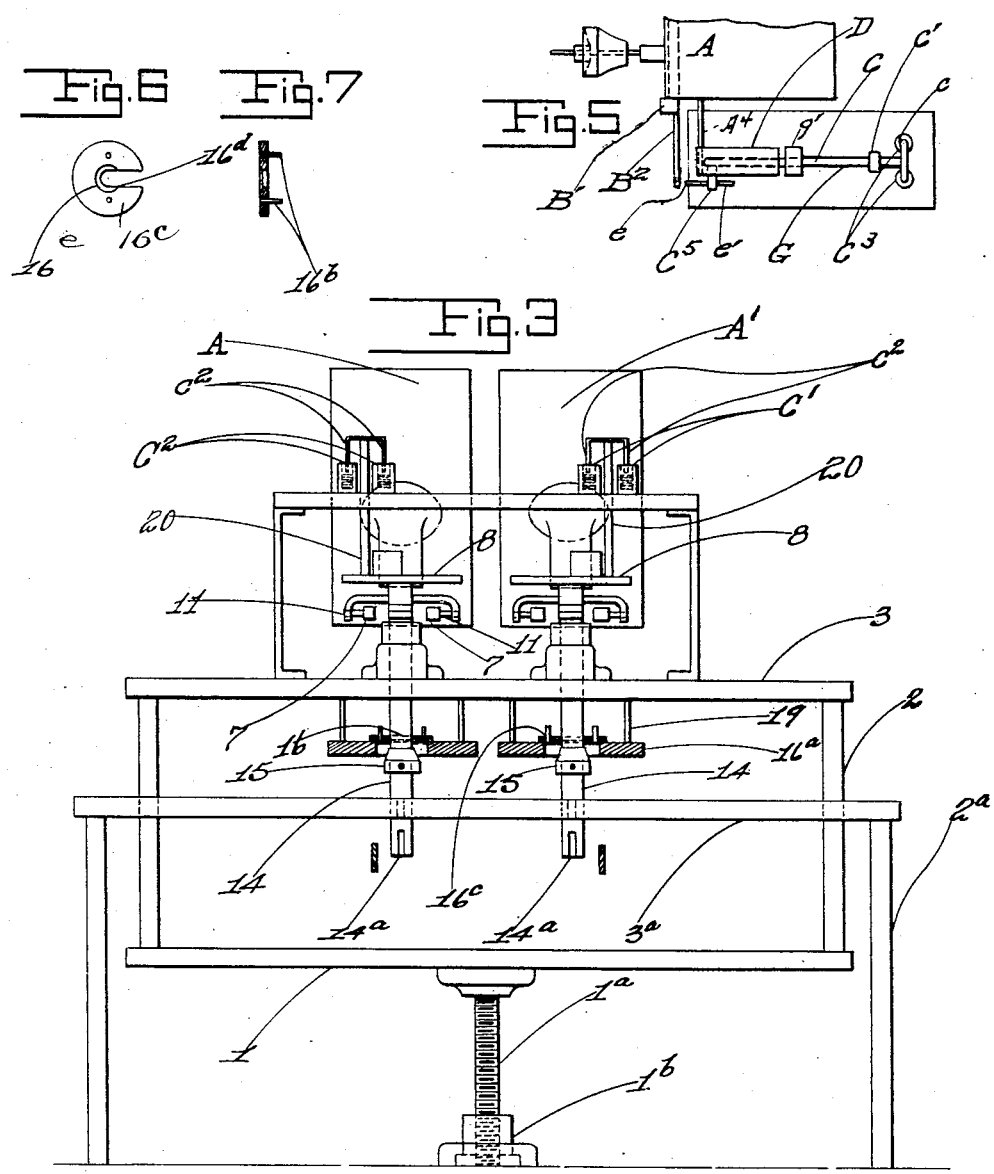
Witnesses
Inventor
Thomas Romer Weyant
By his Attorney T. R. WEYANT.
AUTOMATIC WEIGHING MACHINE.
APPLICATION FILED SEPT. 25, 1906.
934,420.
Patented Sept. 14, 1909.
4 SHEETS—SHEET 4.
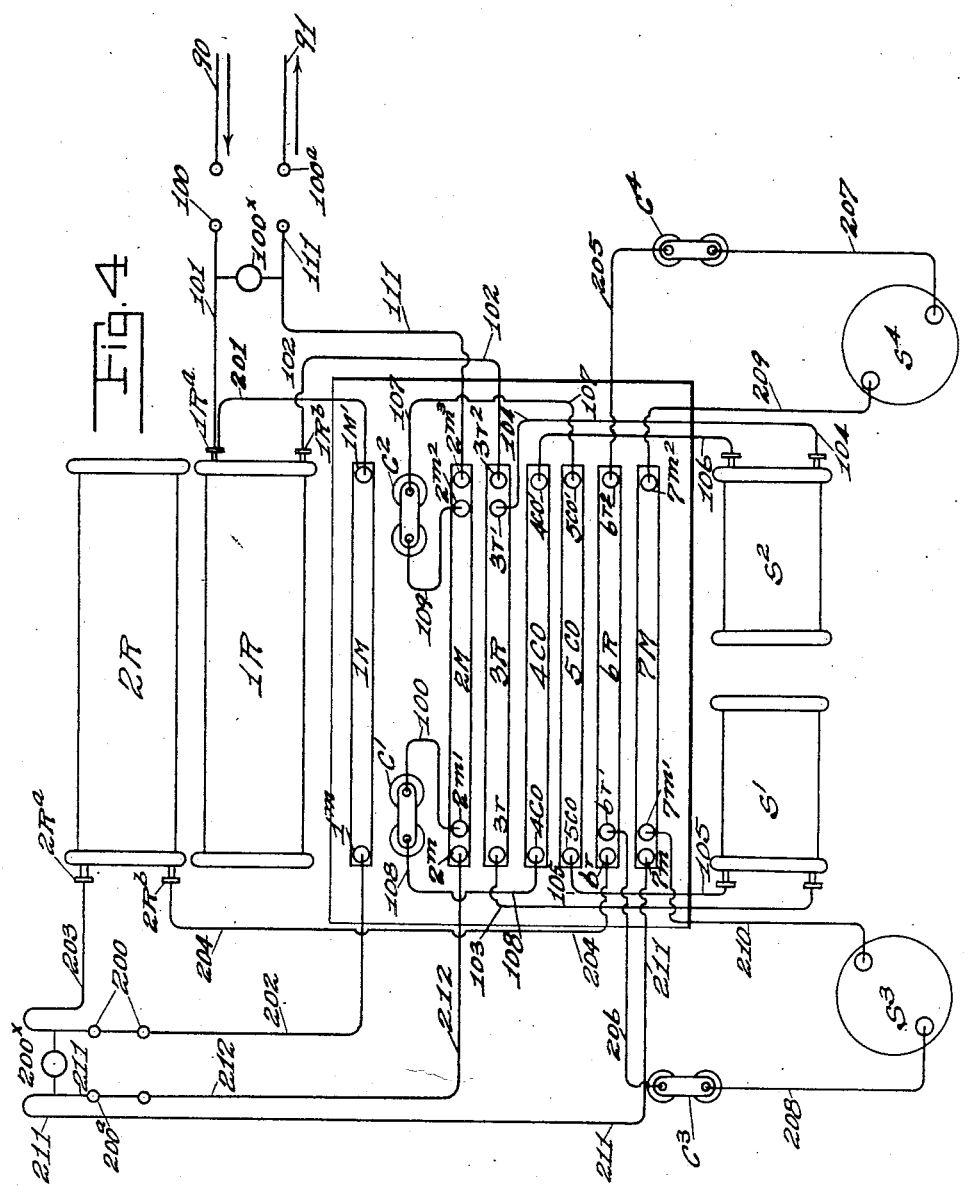
Witnesses
J. Conradi
F. P. Randolph.
Inventor
Thomas Romer Weyant,
By his Attorney R. H. E. Starr.

UNITED STATES PATENT OFFICE.

THOMAS ROMER WEYANT, OF NEW YORK, N. Y.

AUTOMATIC WEIGHING-MACHINE.

934,420.   Specification of Letters Patent.   Patented Sept. 14, 1909.

Application filed September 25, 1906. Serial No. 336,190.

*To all whom it may concern:*

Be it known that I, THOMAS ROMER WEYANT, a citizen of the United States, and a resident of the city, county, and State of New York, have invented certain new and useful Improvements in Automatic Weighing-Machines, of which the following is a specification.

My invention relates to improvements in automatic weighing machines and is especially well adapted for use where it is desired, rapidly and accurately to weigh with one machine different substances in quantities varying considerably in amount. For example, a machine which will weigh ounces with satisfactory accuracy and speed, while it might weigh five pounds or upward with satisfactory accuracy, would not ordinarily weigh such amounts with sufficient speed for commercial purposes.

By the use of my invention I can weigh minute quantities with accuracy and can also weigh large quantities with equal accuracy and with approximately the same speed. My preferred method of accomplishing this result is to have not only what I may call a drip stream coming from the hopper to the scale pan, but also a main stream, the extent of which can preferably be regulated to a predetermined degree. Preferably also these main streams can be used or shut off at will. In such a construction, I prefer to have what I have described as the drip stream sufficiently small to deliver the substance which is being weighed with sufficient slowness to permit the weighing device to actuate the closing device or valve which controls the drip stream with sufficient rapidity to get the accuracy commercially necessary for the particular product to be weighed. In this case I simultaneously use the main stream and the "drip" stream to deliver to the scale-pan rapidly a little less than the entire amount to be weighed. Then I cut off the main stream and continue the "drip" stream to complete the entire weight. The exact percentage of the total weight which will be delivered before cutting off the main stream and also the size of both the main and drip streams should be regulated to suit, first the weight desired, second, the character of the material, and, third, the degree of accuracy demanded by the particular trade. For example, if I am weighing shot or any other heavy and rapidly moving non-viscous substance, it is obvious that the stream will move much more rapidly than if I am weighing a substance which is light, falls slowly, and has a tendency to stick together. Consequently, if I weigh five pounds of shot it would be safer, if not essential, to cut off the main stream of the shot sooner than when I am weighing five pounds of a substance such as oatmeal. In other words, in order to weigh oatmeal rapidly, I might safely continue the main stream until 4¾ pounds had been delivered to the scale-pan, whereas, in the case of shot, it might not be safe to deliver more than 4½ or 4¼ pounds before I cut off the main stream. Again, if I am weighing 20 pounds of any substance instead of 5 pounds, I can use a larger main stream, but might on the other hand have to cut off the main when somewhat less, proportionately, had been delivered from the main chute. Finally, owing to the conditions in various lines of trade and materials, in one branch it may be necessary for a machine to weigh within $\frac{1}{3}$ of one per cent., and in another within $\frac{1}{20}$ of one per cent. of absolute accuracy, etc. This condition, as also the gravital velocity of the substance being weighed would influence the pre-determined size of the "drip" stream.

Obviously, no matter what weight is desired, one of the tests of highest efficiency is to deliver the required weight within the limit of accuracy set by the trade, and with the greatest possible rapidity. Any machine, therefore, to reach the highest efficiency, where it is necessary that it should weigh a variety of different substances, should be adjustable, both for different weights, and to produce a delivery stream of a velocity at will, and also a delivery stream of considerable initial velocity and volume compared with that of the final or "drip" stream. I believe that the best manner of accomplishing this result is to have two streams, first, the "drip" stream, and, second, the main; to have each of these streams adjustable at will to a predetermined extent; to provide means for automatically cutting off the main stream when any predetermined proportion of the total weight desired has been delivered to the scale-pan; and, finally, to provide automatic means for switching or deflecting the drip stream from the scale-pan to which it has been delivering to another scale-pan immediately upon the delivery to the first of the total weight desired. Furthermore, where two scale-pans are used, as is always preferable, it is desirable to have two main streams automatically controlled so that immediately upon either scale-pan being in operative receiving position, its main stream will start delivering thereto. Of course, precaution must be taken to provide automatic means, first, for preventing the possibility of too much material being delivered to either scale-pan; second, for discharging the contents of each scale-pan with reasonable rapidity; third, for preventing the possibility of either the drip stream or the main stream commencing to deliver to either scale pan until after the same has discharged its preceding load and returned to operative receiving position; and, fourth, for automatically bringing the scale-pan to a closed or upright or other proper position for receiving a load promptly after discharging the preceding load.

In the accompanying drawings, I have shown a scale-pan provided with a hinged falling bottom. In such a case it is merely necessary to close and lock this falling bottom. Where a tilting scale-pan is used it would have to be returned to its upright position and locked. Similarly, where any other means is used for discharging the scale-pans, they must be returned to their normal or receiving position and locked in that position before any stream is allowed to deliver thereto.

I will now describe a preferred form of my invention which I have illustrated in the accompanying drawings, in which similar reference characters designate corresponding parts.

In these drawings, Figure 1 is a front elevation; Fig. 2 a side view, partially in elevation and partially in section; Fig. 3 a rear view also partially in elevation and partially in section; and Fig. 4 a diagrammatic view showing the circuits and electrical connection; and Fig. 5 is a detail plan view of devices employed for operating a circuit closing device. Figs. 6 and 7 are, respectively, a plan and a sectional view of a preferred form of weight.

Referring to these drawings and the particular preferred form of construction therein illustrated, 1 designates any suitable support such as a table or platform supported by an adjustable standard $1^a$. To the table 1 are connected four uprights 2, supporting the top or table 3. As shown, another table $3^a$ is supported by legs $2^a$ and the table top is provided with openings through which the standards 2 extend loosely. The top of the table $3^a$ has its central portion removed to permit free vertical movement of certain parts of the weighing apparatus. The standard $1^a$ may be constructed for adjustment in any suitable manner, and in the present case it is shown as a screw within a rotatable threaded sleeve $1^b$, held against vertical movement.

On the table 3 are mounted in any suitable manner a plurality of standards 6, two being shown in the present case, which may be of any desirable character. On each standard a balance-beam 7 is pivotally supported in any suitable manner and each beam is provided with a scale-bar 12 and a sliding weight 13.

As before stated, in the present case, two standards 6 are provided, and as the weighing devices supported by the respective standards are substantially duplicates, a description of one will be sufficient. As shown in the present case the balance beam 7 consists of two parallel bars connected together in any suitable manner. At each end of the beam are two laterally projecting knife bearings 11—11, which respectively carry a support $8^a$, to one of which is attached the scalepan A and to the other a weight platform 8. Each support $8^a$ is provided with a depending rod 14, preferably integral therewith, although the rod may be a separate piece screwed to the support in any suitable manner. The rods 14 extend through bosses 5 on the base of the standard 6, holes 4 in the table 3 and through the central open portion of the table $3^a$. The lower end of each rod 14 is provided with a slot $14^a$ to receive one end of a link 18 and a pin $18^a$ pivotally connects the two parts together. The other ends of the links 18 are pivoted to fixed supports, in the present case to the lower ends of downwardly projecting studs 17 which are shown supported from the under-side of the table 3.

19 designates a suitable number of additional downwardly projecting strips connected at their lower ends to and supporting what I will call an auxiliary weight platform $16^a$. This auxiliary weight platform is provided with a suitably arranged aperture 16 to permit the free passage therethrough of the rod 14 which depends from the weight platform 8. This weight platform is adapted to support auxiliary weights, one being indicated by $16^c$. These weights may be of any desired form but in Figs. 6 and 7 I have illustrated a preferred form. As will be seen, it is provided with a slot $16^d$ for the passage of rod 14 and at the end of the slot a conical portion $16^e$ to coöperate with a cone-shaped portion on rod 14. It is also provided with a plurality of pins $16^b$ to project through openings in any additional weights that may be necessary.

Adjustably connected to that portion of the rod 14, beneath the auxiliary weight table $16^a$ is a cone-shaped collar 15 which, as shown, is secured thereto by a set screw $15^a$ to permit of the precise location of the same being adjusted. The aperture 16 in the weight platform should be of sufficient size to permit the passage therethrough of the collar. I will now describe the operation of this particular part of this apparatus, as, obviously, the same may be used either when the material that is to be weighed is poured in by hand or by automatic feeding devices, or any other way.

Let us assume that it is desired to weigh 5 pounds of any substance. If this is being done by hand where speed is desired, it is well known that an operator is always apt, on a delicately balanced scale to pour in too much of the material and have to scoop some of it out again. This means a waste of a certain amount of time, and in the case of some substances has other disadvantages. Consequently, it is desirable to have the machine give some warning of the fact that the desired weight is nearly completed. To accomplish this, I place on the main weight platform 8 of the scale, a weight 9 which is somewhat less than the total amount of the desired weight. If I am weighing 5 pounds, I may, for example, place only $4\frac{1}{2}$ pounds upon the main weight platform 8. I then place an auxiliary weight $16^c$ of $\frac{1}{2}$ pound, or whatever the remainder may be, on the auxiliary platform $16^a$; as a result, so soon as the $4\frac{1}{2}$ pounds is reached, the scale-pan A will drop, raising the rod 14 until the cone-shaped collar 15 comes into contact with the auxiliary weight $16^c$. The operator, seeing the scale-pan move, is warned and proceeds to feed the scale-pan more slowly and carefully and with a finer stream until the balance of the entire weight desired, or in this specific case, the remaining $\frac{1}{2}$ pound is supplied, when the weight of the auxiliary weight $16^c$ is overcome and lifted to a balance. As I will point out more fully later on, I use this arrangement with very great advantage with the rest of the apparatus shown, in that I have it connected up in such a manner as to cause the first drop of the scale-pan (say at $4\frac{1}{2}$ pounds) to close or cut off the main stream. Obviously, this portion of my invention which I have just described will be of great value if connected up with any type of delivery apparatus in such a way as to cause the first or partial drop of the scale-pan, either to cut off the main stream or in any way to reduce the velocity or volume of delivery to the scale-pan of the substance to be weighed.

I will now describe the particular form of scale-pan shown and the hopper and delivery controlling contrivances connected therewith, and thereafter the connections between the weighing apparatus and the delivery devices, and the operation thereof.

The scale-pan A is, as shown, provided with a drop bottom $a$ hinged at one edge in any suitable manner as indicated at $a'$. Rigidly connected with the bottom $a$ is a lever B, projecting outwardly from the front face of the scale-pan in substantially a horizontal plane, and provided with a screw-threaded portion $b'$ on which is mounted an interiorly screw-threaded weight $b^2$.

$B^1$ designates another lever-arm also rigidly secured to the hinged edge of the bottom $a$ but arranged at one side of the scale-pan and projecting downwardly at substantially a right angle to the lever B. As shown, this downwardly projecting lever-arm $B^1$ is provided with a substantially horizontal projection $B^2$. Obviously, when the scale-pan is emptied, the weighted lever B will close the bottom $a$ and bring the lever-arm $B^1$ to a substantially vertical position. So soon as material is delivered to the scale-pan however, in sufficient volume to overcome the weight $b^2$ the bottom will open, raising the weight $b^2$ and the lever-arm $B^1$ unless some means is provided for locking the same. F shows such a means in the form of a latch, pivoted between its ends to the side of the scale-pan as indicated at $f$, and provided at one end with a hook adapted to engage with the lower end of the lever-arm $B^1$. The tail-portion $f'$ of the latch is heavier than the hook portion and stops $f^2$ $f^3$ are provided to limit its movement.

When the scale-pan is in operative receiving condition the drop bottom $a$ will be closed and locked in such position by the engagement of the hook on latch F with lever-arm $B^1$. When sufficient material has been delivered to the scale-pan A to cause it to move downwardly a projection or stud, arranged at a suitable point in the path of downward travel of the tail end $f'$ of the latch F will trip the latch, thereby releasing the lever-arm $B^1$ and consequently the bottom $a$—thus permitting the contents of the scale-pan to discharge by gravity. As shown, the tripping device for the latch F is in the form of a pin $f^4$ projecting from a post $g$ to be hereinafter referred to. Obviously the effect of the weight $b^2$ can be varied by screwing the same inward or outward on the screw-threaded extension $b'$ thus decreasing or increasing the leverage thereof.

G designates a table of slate or other insulating material supported in any suitable manner as by a series of posts or uprights $g$, in turn supported upon the table 3. Mounted on this table G is a post $g'$.

C and D are two levers pivoted thereto. Lever C is made of fiber or other suitable insulating material, is pivoted between its ends to post $g'$ and carries at its rear end an electrical conductor consisting of two electrically connected pins $c$ and a weight $c'$ sufficient to keep that end of the insulated lever arm normally in downward position and the pins $c$ in contact with mercury in mercury-cups $C^3$, or with other suitable electrical contacts. As I will describe later on whenever the pins are in contact with the mercury in the mercury-cups $C^3$ circuit will be closed to energize an electro-magnetic device for the purpose of opening a chute to deliver a main stream to the scale-pan.

The lever D is pivoted at one end to post $q'$ and carries a weight $d$ sufficient, when lever D is brought into contact with the front end of lever C to overcome the weight of the rear end of the lever C and raise the same and lift the pins $c$ out of contact with the mercury. Projecting from the side of the scale-pan is a pin $A^4$ on which the free end of the lever D normally rests.

E designates a latch pivotally mounted on the table G, provided with an extension $e$ projecting toward the front of the scale-pan and provided with a hook adapted to co-act with a pin $C^5$, extending laterally from the front end of the lever C, to hold the lever locked when its aforesaid front end is in a downward position and the contact pins $c$ out of contact with the mercury. The operation of this portion of my construction is as follows:—When the scale-pan is filled to within the predetermined extent of the total weight desired, or when a volume of material equal to the amount of the weight 9, placed on the main weight platform 8, has been delivered to the scale-pan, the latter descends carrying with it the pin $A^4$ and thus allowing the lever arm D to swing downward and bring its weight to bear upon the front end of the lever C, lowering the same and raising the rear end thereof and breaking the contact between the pins $c$ and the mercury, and thus closing the main delivery chute, as will be hereinafter explained. The scale connections, comprising the rods 14 and the adjustable collars 15 are so arranged as to cause the collar 15 of the weight platform which is ascending to come into contact with the auxiliary weight $16^c$, thus temporarily stopping any further descent of the scale-pan. The "drip" stream continues to deliver material as will be more fully explained hereafter to the scale-pan until the total desired weight has been delivered and the auxiliary weight $16^c$ overcome. The scale-pan then descends still farther until the tail portion $f'$ of the latch F comes into contact with the pin or stud $f^4$ thus tripping the latch and allowing the weight of the load in the scale-pan to open the hinged bottom $a$ and permit discharge of the load.

The scale-pan A may begin to rise as soon as it begins to discharge its load and might even rise sufficiently to cause pin $A^4$ to lift lever D before the load is fully discharged and the bottom $a$ again closed, were it not prevented by some additional means. Obviously, the main stream must not be permitted to flow until the bottom $a$ is closed, and since this stream is controlled by the contacts on lever C, it is necessary to hold the contacts out of contact with the mercury until the bottom $a$ is closed. The latch E is provided for this purpose and its hook $e$ will hold the front end of the lever C in depressed position even after the lever D has been moved out of engagement with it by the upward movement of the scale-pan A and pin $A^4$. When, however, the load is fully discharged from the scale-pan the weight $b^2$ will act to close the bottom $a$. In this movement the lever-arm $B^1$ will be moved downwardly and inwardly with considerable velocity beyond its normal position when the bottom $a$ is closed and locked. This excess of movement will cause the lateral projection $B^2$ of the lever arm $B^1$ to strike the extension $e$ on the latch E and thereby disengage the hook $e'$ from the pin $C^5$ and permit the rear end of the lever C to drop and the pins $c$ to contact with the mercury. A circuit will then be closed which will cause the main chute to be opened to again discharge into scale pan A.

The mercury-cups for the other scale, equivalent to the cups $C^3$, are not shown except in Fig. 4, where they are indicated by $C^4$. It is, of course, understood that all the devices heretofore described in connection with scale-pan A are duplicated with respect to any other scale-pan, such as that designated $A^1$.

I will now describe my preferred form of hopper and chutes for delivering the drip stream and the main stream to the scale-pans, and the controlling devices for such streams.

M designates a hopper of any suitable form. As shown it is provided at its lower extremity with converging flanges $m$ forming an opening $m'$ of comparatively limited area, below which is arranged a passage N, preferably of substantially the same cross-sectional area as the opening $m'$ and preferably also substantially vertical. Below this are two delivering chutes O and $O^1$, each adapted to deliver to its respective scale-pan beneath the same and separated by any suitable form of division such as $O^2$. To the top of this division $O^2$ a deflector P is pivoted at its lower edge and connected near its upper end to an armature common to what I will call the drip solenoids, indicated by $S^1$ and $S^2$. Obviously, when the upper end of this deflector is forced in one direction, such as to the right (Fig. 1) it will shut off any supply from the hopper to the chute O and will deflect the entire stream to the chute $O^1$. When deflected by a movement of the solenoid to the left the chute $O^1$ will be cut off and O opened. By means of certain connections which I will describe later in detail, this deflector is automatically actuated immediately upon the delivery to the scale-pan of the total desired weight and cannot be so deflected to cut off the supply from the "drip" chute to the scale-pan until the same has received its entire weight.

L and L¹ designate respectively two main delivery chutes, each controlled by a valve or swinging bottom $l$ and $l'$ respectively. These swinging bottoms are in turn respectively connected to the armatures of what I will call the main solenoids S³ and S⁴, operated independently of each other and connected with the mercury-cups C³ and C⁴, to be opened and closed by the same for the purpose already described and in a manner to be more fully described hereafter.

Briefly, the operation of the mechanical parts of my apparatus therefore, are as follows: Let us assume that the scale-pan A has just received its full weight and is about to dump and that the scale-pan A¹ has received about half of its weight. Then as shown both the drip stream and the main stream will be pouring into the pan A¹. Solenoid S⁴ being energized to open the main chute L¹ and the solenoid S² being energized to hold the deflector P in the right hand position and open the drip chute O¹ and close the drip chute O. The scale pan A dumps and rises, closes its bottom $a$ and drops the pins $c$ on its lever C into the mercury-cups C³. Immediately, the second solenoid S³ is energized and the main chute L opened. Thus we have both main delivery chutes working simultaneously and delivering to their respective scale-pans but the "drip" stream delivering only to the scale pan A¹. When the scale pan A¹ receives that predetermined portion of its weight such as 4½ lbs. it drops part way as already described and breaks the contact with the mercury-cup C⁴, deënergizing the solenoid S⁴, closing valve $l'$ and shutting off the main stream from the scale pan A¹. The "drip" stream however, may still continue to flow into the scale pan A¹ from the chute O¹ until the entire weight desired is delivered thereto, when, by connections which I will hereafter describe the solenoid S² will be deënergized. As the solenoid S¹ has already been energized by the upward movement of the scale pan A by means of connections which I will hereafter describe in detail, the armature N is immediately pulled to the left (Fig. 1) and the "drip" stream is now deflected into the scale pan A into which the auxiliary stream has been continuously pouring. The scale pan A¹ is dumped and the operation which I have described is repeated.

I will now describe the connections for controlling and operating the drip solenoids S¹ and S² for controlling the "drip" stream. The weight platform 8 of each scale is provided with an insulated rod 20, carrying two pins $c^2$ suspended over the mercury-cups. The mercury-cups for scale A¹ are indicated by C' and those for scale A by C². The rods 20 and their contact-pins are so regulated with respect to the mercury-cups that the pins are raised out of contact with the mercury, immediately upon the collar 15 raising the auxiliary weight 16ᶜ. In other words, the moment that the scale-pan receives its full weight and starts to lift the auxiliary weight 16ᶜ, contact is broken between the mercury and the pins. The mercury-cups C' are in circuit with a source of supply and the drip solenoid S². Obviously when the pins touch the mercury the circuit is closed and the solenoid S² is energized. As soon as the contact is broken the solenoid S² becomes deënergized. The mercury-cups C² are in a similar circuit with regard to the drip solenoid S¹.

I will now describe the electrical connections of one form of wiring adapted to produce the results hereinabove stated. Before going into details I may state that I prefer, first, always to have a resistance interposed between the source of supply and the solenoid to be actuated thereby, excepting in battery work, and, second, that in the case of the two drip solenoids for operating the deflector, I wish to have the same always in circuit and energized excepting when the mercury cups and pins controlling the same are out of contact. In other words, I prefer to accomplish my operations not by making contact and energizing the drip solenoids but by breaking the contact and deënergizing one solenoid—both solenoids being normally energized. Fig. 4, as previously stated, is a diagrammatic illustration of my preferred form of wiring.

Taking up, first, the drip solenoids S¹ and S², we will assume that the wire 90 is the positive wire leading from any suitable source of supply.

91 is the return or negative connecting wire leading back to the source of supply.

100 and 100ᵃ respectively designate the main switch. The current coming from the source of supply through the connecting wire 90 passes through the positive side 100 of the main switch through the line 101 to a binding post 1—Rᵃ into and through the resistance coil 1—R to the other binding-post 1—Rᵇ through the line 102 and to a binding-post or other suitable connection 3ʳ² in contact with a bus-bar or other continuous electrical connection 3ᴿ. From this bus-bar lines 103 and 104 lead respectively to the solenoids. From the solenoids the current passes respectively through the lines 105 and 106 to cross-over bars designated respectively 5ᶜᵒ and 4ᶜᵒ. The current from 5ᶜᵒ passes by the line 107 up to the mercury cup C² which is the contact breaker controlling the solenoid S². From the cross-over bus-bar 4ᶜᵒ, the current passes by the line 108 up to the mercury cups C' or the contact breaker controlling the solenoid $S^1$. Another bus-bar $2^M$ is connected with each of the mercury-cups $C'$ and $C^2$ and also connected through the binding-posts $2^{m3}$ with line 111 which leads to the negative line $100^a$ of the main switch and thus to the negative line 91 to the source of supply. Obviously, therefore, the drip solenoids $S^1$ and $S^2$ would always be simultaneously energized if it were not for the occasional break of one or the other circuit by means of their respective mercury-cups and pins. So soon as the pins are withdrawn, as already described, from the mercury-cups $C'$ the solenoid $S^1$ becomes de-energized, thus causing the solenoid $S^2$ to operate. The converse is true whenever contact is broken at the mercury-cups $C^2$.

Turning now to the means for connecting main solenoids $S^6$ and $S^4$ with their respective controlling mercury-cups and pins $C^3$ and $C^4$, I would first attract attention to the auxiliary switch, the positive side of which is designated by 200 and the negative side by $200^a$. The purpose of this switch is absolutely to throw out the circuits for solenoids $S^3$ and $S^4$ or prevent the possibility of any energizing of either main solenoid. The current again comes through the positive connecting line 90 from the source of supply, through the positive side 100 of the main switch, thence through the line 101 and to the binding-post $1—R^a$ connected to the resistance coil $1^R$. The line 201 may be called a continuation of the line 101 merely wrapped around this binding-post and leading to the bus-bar $1^M$ from whence the current passes by the line 202 to the positive side 200 of the auxiliary switch already mentioned. If this auxiliary switch is open the current obviously can go no farther than the line 200 but will merely pass through the resistance $1^R$ as already described to operate the drip solenoids $S^1$ and $S^2$. On the other hand, if this auxiliary switch is closed, the current passes across the side 200 thence by the line 203 to an auxiliary resistance coil $2^R$, through the same to line 204 and thence to a bus-bar $6^R$. This bus-bar $6^R$ is connected by the lines 205 and 206 respectively to the mercury cups $C^3$ and $C^4$, which respectively form the contact makers and breakers for the main solenoids $S^3$ and $S^4$. Lines 207 and 208 respectively carry the current from the contact breaker $C^3$ and $C^4$ to the respective solenoids $S^3$ and $S^4$. Lines 209 and 210 respectively carry the current when it has passed through the solenoids $S^3$ and $S^4$ respectively to a common bus-bar $7^M$ from whence it passes by a binding-post or other suitable connection $7^m$ to the line 211 and thence to the negative side $200^a$ of the auxiliary switch, across the same to the line 212 and thence to the bus-bar $2^M$ through the binding-post $2^{m3}$ to and through the line 111, and across the negative side $100^a$ of the main switch and out through the negative line 91, back to the source of supply. Obviously, again, the current here passes first through the auxiliary resistance $2^R$ and thence to the common bus-bar $6^R$ and would always simultaneously pass therefrom through the main solenoids and back to the common bus-bar $7^M$, excepting when one or the other of the mercury point makers and breakers $C^3$ or $C^4$ is open.

It will be seen furthermore from the above, that the circuit for actuating the drip solenoids $S^1$ and $S^2$ of the deflector is entirely separate and distinct from the circuit for actuating the main chutes $L$ and $L^1$ respectively.

$100^x$ and $200^x$ designate incandescent bulbs across the lines at a point near the main and auxiliary switches, respectively, which I prefer to use for the purpose of indicating when the circuit is closed or open.

What I claim and desire to secure by Letters Patent is—

1. In an automatic weighing machine, the combination with a scale, of a hopper having a main delivery spout and a drip spout for discharging into the scale pan, an automatically closing valve for controlling the flow of material through the main spout, an electric motor for opening said valve, a valve for controlling the flow of material through the drip spout, an electric motor for controlling the last named valve positively to open and close said drip spout, and circuits controlled by the movement of the scale pan for operating said electric motor.

2. In an automatic weighing machine, the combination with two scales, of a hopper having two discharge spouts at its lower end to discharge into the respective scale pans, a deflector for controlling the flow of material through said spouts, main delivery spouts leading from said hopper to discharge into the respective scale pans, valves for closing said main delivery spouts and electro-magnetic means operated by the movement of the scale pans for controlling said deflector and valves.

3. In an automatic weighing machine, the combination with two scales, of a hopper having two discharge spouts at its lower end, a deflector for controlling the feed of material through said spouts to the respective scale pans, main delivery spouts leading from said hopper to discharge into the respective scale pans, valves for closing said main delivery spouts, electro-magnetic means controlled by the movement of the scale pans for operating the valves, and other electro-magnetic devices controlled by the movement of the scale pans for operating said deflector.

4. In an automatic weighing machine, the combination with two scales, of a hopper having two drip spouts at its lower end to discharge into the respective scale pans, a deflector for controlling the flow of material through said spouts, main delivery spouts leading from said hopper to discharge into the respective scale pans, automatically closing valves for closing said main delivery spouts, and electro-magnetic means operated by the movement of the scale pans for first opening the valve of a main delivery spout and subsequently for controlling said deflector.

5. In an automatic weighing machine, the combination with two scales, of a hopper having two discharge spouts at its lower end and constituting drip feeds to the respective scale pans, a deflector for controlling the flow of material through said spouts, main delivery spouts leading from said hopper to discharge into the respective scale pans, valves for closing said main delivery spouts, electro-magnetic devices operated by the initial movement of the scale beams to close said valves, and separate electro-magnetic means controlled by the final movement of the scale beams for operating the deflector to control the drip feed.

6. In an automatic weighing machine, the combination with two scales, of a hopper having a discharge spout at its lower end to discharge into the scale pan, a valve for controlling the flow of material through said spout, a solenoid for operating the valve, a normally closed circuit for operating said solenoid, mercury cups included in said circuit, a pivoted lever carrying contact pins normally in engagement with the mercury in said cups, and means controlled by the downward movement of the scale pan for rocking said lever to disengage the pins from the mercury.

7. In an automatic weighing machine, the combination with two scales, of a hopper having a discharge spout at its lower end to discharge into the scale pans, a valve for controlling the flow of material through said spout, a solenoid for operating the valve, a normally closed circuit for operating said solenoid, mercury cups included in said circuit, a pivoted lever carrying contact pins normally in engagement with the mercury in said cups, and a weighted lever, controlled in its movement by the up and down movement of the scale pan, for rocking the pin carrying lever from the mercury.

8. In automatic weighing machines, the combination with a scale pan, of a hopper having a main feed spout and a drip feed spout, valves for controlling said spouts, electric motors for controlling the respective valves, circuits leading from a common source of electric supply to the respective motors, and means for cutting out the circuit of the motor controlling the valve of the main feed spout.

9. In an automatic weighing machine, the combination with a scale pan, of a spout for discharging material into said pan, a valve for controlling the flow of material through said spout, a solenoid for operating said valve, a circuit breaker in the solenoid circuit operated by the movement of the scale pan to make and break said circuit, a hinged bottom in said scale pan, a locking device to hold said circuit breaker in open position and means operated by the closing of the bottom of said scale pan to release said lock.

10. In an automatic weighing machine, the combination with a scale beam having a scale pan at one end and a weight supporting platform at its other end, of a fixed supplemental weight platform below the said weight supporting platform, a rod depending from the weight end of said scale beam, a weight on said supplemental weight platform having an opening therein through which the rod may pass freely, and a collar on the rod below said weight for engaging and lifting said weight when the scale pan moves downwardly.

11. In an automatic weighing machine, the combination with a scale beam having a pan at one end and a weight at its other end, a drip feed spout and a main feed spout adapted to discharge into said scale pan, valves for controlling the flow of material through said spouts, electro-magnetic means for operating said valves, a fixed supplemental weight platform below the scale beam, a rod depending from the weight end of said scale beam and extending through said platform, a weight on said supplemental weight platform having an opening therein through which the rod may pass freely, a collar on the rod below the weight for engaging and lifting said weight when the scale pan moves downwardly, and circuit controlling devices included in the circuits of said electro-magnetic devices and operated by the downward movement of the scale pan to effect the closing of the valve of the main delivery spout when the beam weight is lifted, and to effect the closing of the drip spout valve when the supplemental weight is lifted.

In witness whereof, I have signed my name to the foregoing specification in the presence of two subscribing witnesses.

THOMAS ROMER WEYANT.

Witnesses:
H. R. BAUER,
WM. W. ROBERTS.